Nov. 4, 1969 T. J. PLEVYAK 3,476,175

VAPOR-PHASE COOLING OF ELECTRONIC COMPONENTS

Filed Nov. 2, 1967 3 Sheets-Sheet 1

INVENTOR
T. J. PLEVYAK
BY Charles E. Graves
ATTORNEY

United States Patent Office 3,476,175

Patented Nov. 4, 1969

3,476,175

VAPOR-PHASE COOLING OF ELECTRONIC COMPONENTS

Thomas J. Plevyak, Madison, N.J., assignor to Bell Telephone Laboratories, Incorporated, Murray Hill, N.J., a corporation of New York Filed Nov. 2, 1967, Ser. No. 680,092
Int. Cl. F28d *15/00;* H01b *7/34;* F25d *15/00*
U.S. Cl. 165—105 4 Claims

ABSTRACT OF THE DISCLOSURE

Improved vapor-phase heat exchange apparatus useful in cooling solid state components is disclosed featuring insulated mounting fixtures immersed into the evaporator fluid and a condenser made up of hollow cooling fins.

This invention relates to heat exchange apparatus in general and more particularly to vapor-phase cooling apparatus especially useful with solid state circuit components.

BACKGROUND OF THE INVENTION

Conventional techniques for cooling circuit components include solid metal heat sinks, forced air systems, and closed and open pumped liquid systems. Recently, the potential advantages of vapor-phase cooling systems have been explored and several designs of static heat exchangers have resulted which are more compact and efficient than static heat sinks and which generally obviate the maintenance, reliability and noise problems associated with the earlier-mentioned dynamic systems.

In the sealed vapor-phase heat exchanger, heat energy is physically transported from an evaporator to a condenser through the flow of vapor. Due in part to this internal vapor flow, these systems offer the potential of a very low overall thermal resistance. Additionally, heat dissipation in a thermally remote condenser permits much more compact equipment arrangements as well as reduced internal cabinet air temperatures.

The design of the evaporator and of the condenser is critical to a vapor-phase heat exchanger characterized by compactness and low overall thermal resistance; and the added requirement for electrical isolation between the solid state components being cooled and the heat exchanger itself increases the dependence on a correct design. In this broad characteristic, vapor-phase heat exchangers in the prior art are notably lacking.

A primary object of the invention, therefore, is to dissipate large quantities of heat through a compact and efficient static vapor-phase cooling system.

A further object of the invention is to permit a closer packing of solid state components in equipment cabinets which heretofore has been made difficult by the lack of a truly compact and efficient vapor-phase heat exchange unit.

A more specific object of the invention is to effect a more efficient removal of heat from solid state components and thus to lower their operating temperature and enhance their expected lifetime.

In achieving these and other objects, the invention makes use of an evaporator in which component mounting fixtures are immersed directly into the body of the fluid, thus to provide a surface area for direct exchange of heat between the component mounting fixture and the heat exchange fluid. Advantageously, and in accordance with a further facet of the invention, each component mount is electrically insulated from the evaporator proper through a ceramic or other electrically nonconductive washer which adds no thermal resistance to the path of heat flow. Specifically, the intruding portion of the mount is disposed through the electrically insulative washer.

An added aspect of the invention involves the use of a condenser made up of hollow cooling fins, each fin consisting of two wide area thin copper sheets spaced apart to permit the entry of vapor and the uniform dispersion of heat. As will be described in greater detail below, the condenser preserves the favorable geometry of conventional cooling fins but achieves an effectiveness of unity in contrast to all known prior art vapor-phase heat exchange condensers.

A complete understanding of the invention, its further objects, features and advantages will be gained from a reading of the description to follow of an illustrative embodiment thereof.

DETAILED DESCRIPTION OF THE INVENTION

The transfer of heat in vapor-phase cooling involves the processes of evaporation and condensation. In the evaporation process, heat energy is added to liquid molecules, causing them to leave the liquid surface into the vapor phase. A pronounced convection heat transfer mechanism is involved. Condensation is the return of a vapor to its liquid state through release of the heat of vaporization on a cooler surface.

Very often, the prime concern in electronic equipment is the need for reduced equipment size and lower component operating temperatures. For a vapor-phase heat exchanger, used to attain these ends, the preferred evaporator arrangement must be of simple geometric form and must provide a means for mounting the circuit components in close proximity to the evaporator fluid. In many cases each component must be electrically insulated from the heat exchanger and the component mounting technique should be simple and should require ordinary tools.

Essential to achieving compactness and lower component operating temperatures is a condenser design that offers the lowest possible thermal resistance to the transfer of heat to air through natural convection and in the smallest possible volume. In meeting the compactness requirement, the condenser volume should be no greater than the volume occupied by the best conventional heat sinks which the unit is designed to replace. Additionally, it is desired that condensate return to the evaporator under gravity flow and that the entire system be closed and static.

Figure 1:
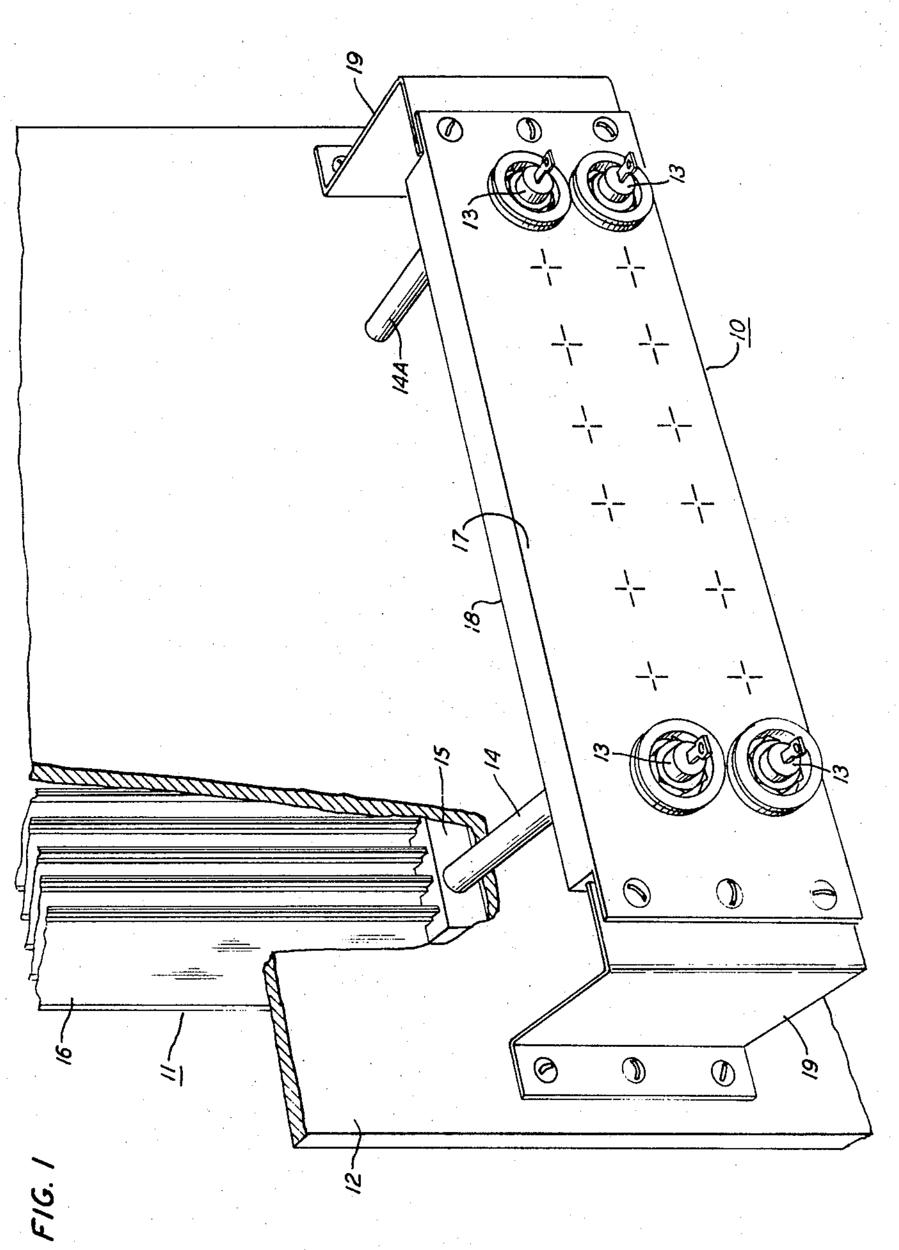
FIG. 1 is a perspective view showing the mounted evaporator and condenser.

FIG. 1 illustrates one embodiment of the present invention that carries out the above objectives. Shown there is a complete heat exchange unit comprising an evaporator 10 and a condenser 11 mounted on a vertical plate 12 representing for example the interior mounting base of a bay of equipment. Numerous solid state components 13 are mounted in accordance with the invention upon evaporator 10 in a manner to be described; and the connected to other circuitry (not shown) in whatever manner called for by the equipment. Piping such as pipes 14, 14A lead from the rear of the evaporator 10 through the mounting plate 12 and into a manifold 15 to which, in accordance with another aspect of the invention, a plurality of hollow cooling fins 16 are connected in a manner to be described.

Figure 2:
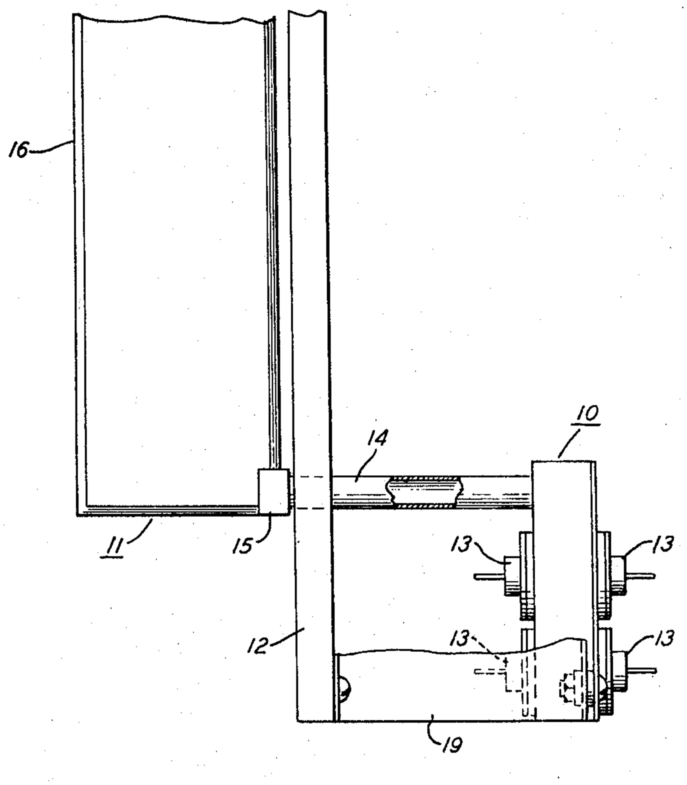
FIG. 2 is a side elevation view of the evaporator, condenser and connecting tubework.
Figure 3:
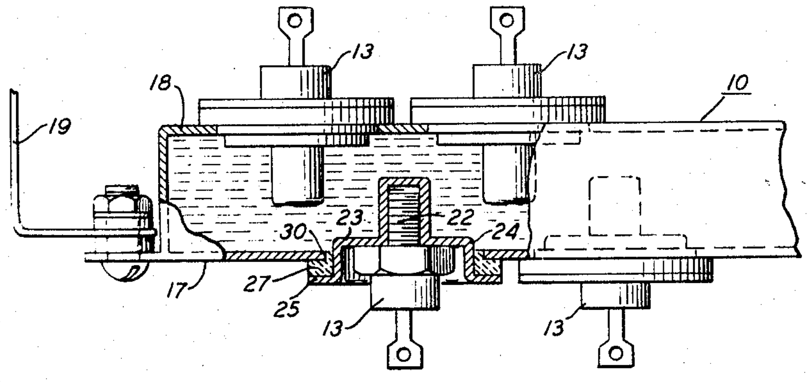
FIG. 3 is a sectional side view of the evaporator.
Figure 4:
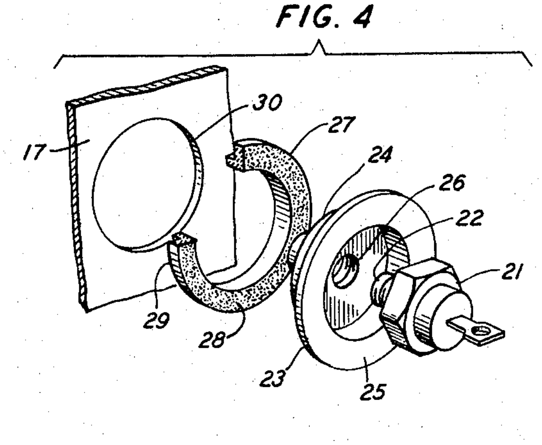
FIG. 4 is an exploded view of a plug.

FIGS. 2, 3 and 4 illustrate the construction of evaporator 10. Essentially evaporator 10 is constructed as a closed housing consisting of copper sheets such as front sheet 17 and back sheet 18 which are soldered, brazed or welded together to form an elongated passageway. Suitable means such as brackets 19 serve to conveniently mount evaporator 10 onto the backboard 12. The pipes 14, 14A lead from this passage as so defined into manifold 15 which, as seen in FIG. 2, defines the lowermost portion of condenser 11.

FIG. 4 shows in expanded view fashion the component mounting scheme of the present invention. A typical heat generating semiconductor component as for example a diode or an SCR, designated 21, is suitably mounted on or in stud 22 which fits into mounting fixture 23. The latter comprises a body portion 24 with a top flange 25 and an interior extension 26 which is threaded to accommodate stud 22. Mounting fixture 23 advantageously is constructed of copper. A ceramic washer 27 with metalized surfaces 28, 29 mounts on and through a circular hole 30 into the interior of evaporator 10, there being numerous such entrances in the evaporator each to accommodate one mounting fixture. Washer 27 is affixed to its hole 30 with a soft solder or brazed seal on metallic surface 29; and similarly mounting plug 23 is affixed to the other side of washer 27 with soft solder. When so disposed, the extension 26 protrudes well into the heat transfer fluid as shown in FIG. 3. Only a thin metallic member lies between the component 21 and the fluid and the electrically insulated member 27 does not lie in the path of heat flow. Additionally, component mounting is easily accomplished with a conventional socket type torque wrench applied to the hexagonal nut of mount 22.

Figure 5:
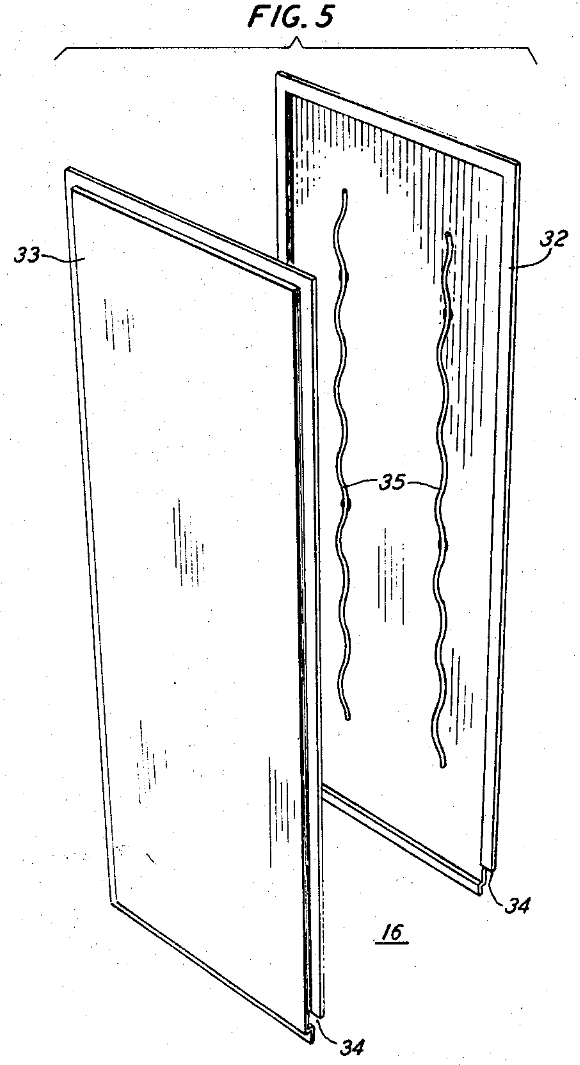
FIG. 5 is a perspective view of the condenser plates.

Pursuant to another aspect of the invention, a highly compact condenser arrangement is achieved with the use of a hollow cooling fin, the structure of which is illustrated in FIG. 5. Each hollow cooling fin 16 is made up of two thin gauge broad area copper sheets 32, 33, each of which is formed with a flange around its periphery. The sheets 32, 33 are joined, i.e. welded, together at the flange. A cutout portion 34 enables a connection to be made from the assembled sheets 32, 33 to manifold 15, as shown in FIG. 1. Wire spacers such as 35 are provided to prevent collapse of the plates 32, 33 under vacuum pressure. In practice it may be necessary by conventional means to provide for positive internal pressures that may be present in the hollow cooling fins. The fin 16 as well as the interconnecting vapor tubes 13, 14 the constructed of copper. A typical depth for each cooling fin 16 is approximately 4½ inches with a height of approximately 12 inches and a thickness of ⅛ inch. A convenient array size is approximately 22 inches.

In conventional fashion the liquid coolant employed is Freon 113 (trichlorotrifluoroethane) which boils at 47° C. under a vapor pressure of one atmosphere. Its use results in a low pressure heat exchanger which is structurally less troublesome.

A principal advantage of the condenser arrangement described is that it offers no internal conduction loss whatsoever. This is illustrated by the following. One measure of performance of a conventional metal cooling fin is its so-called effectiveness, $\eta$, which is defined as the heat dissipated by the fin divided by the heat dissipated if the entire fin surface were at the base temperature. In the present invention, the temperature over the entire fin surface area is constant due to the uniform spreading and condensing of vapor within the fin and hence, the fin effectiveness is unity. An observer looking at a condenser made up of hollow fins constructed in accordance with the teachings of the present invention would see what appears to be a bank of ordinary cooling fins performing with an effectiveness, $\eta$, of unity since the entire surface temperature is constant. Typically $\eta$ might equal 0.5 for solid metal cooling fins, by way of comparison. Hence for cooling fins in which $\eta$ equals unity, the surface area and thus the volume required to dissipate a given quantity of heat is reduced approximately by ½. Thus the objective of a reduced size heat exchange unit is achieved.

It is of course necessary to assure the integrity of the hermetic seal throughout the entire heat exchanger. Conventional seals however are fully satisfactory to achieve the structure contemplated by the invention.

The teachings of the present invention find particular use in cases where a relatively small number of high power solid state devices are employed, since here the cooling problem is quite severe. The most limiting case is represented by a single component cooled with a single heat sink In such case the size and weight of the required performance conventional heat sink often becomes unwieldy. Experiments have indicated that when the overall thermal resistance from component case to ambient air, designated $\theta_{ca}$, is approximately .335° C. per watt, vapor-phase cooling systems of this design begin to offer a real size advantage. At $\theta_{ca}$=.20° C. per watt, for example, a natural convection heat sink would be 2.5 times larger than its thermally equivalent vapor-phase cooling system.

It is to be understood that the embodiments described herein are merely illustrative of the principles of the invention. Various modifications may be made thereto by persons skilled in the art without departing from the spirit and scope of the invention.

What is claimed is:

1. A vapor-phase heat exchange unit comprising:

an evaporator comprising a four-sided elongated chamber having a rectangular cross section oriented vertically;

a plurality of component-mounting fixtures disposed through the two upright sides of said chamber, each fixture having a leg extending into said chamber;

a condenser consisting of a lower manifold, a plurality of hollow cooling fins mounted upright upon said manifold, each fin comprising first and second copper sheets narrowly spaced from each other with the interior space of each said fin communicating with said manifold;

a ceramic washer disposed between each said mounting fixture and said chamber with said fixture leg extending through said washer; and a plurality of substantially horizontal tubes connecting between a side surface of said manifold and the top region of a one of said chamber upright sides.

2. A heat exchanger in accordance with claim 1, further comprising a threaded interior portion to said leg, a threaded insert for engagement in said threaded leg and means for mounting an electrical component upon said insert.

3. Apparatus in accordance with claim 2, wherein said mounting fixture plurality are disposed in rows on opposite sides of said chamber, said legs interleaving from side to side.

4. A heat exchange unit in accordance with claim 3, wherein the spacing between each said first and said second copper sheet of each said cooling fin is maintained by wire spacers to prevent collapse of said sheets under vacuum pressure.

References Cited

UNITED STATES PATENTS

| | | | |
|---|---|---|---|
| 2,965,819 | 12/1960 | Rosenbaum | 317—234 |
| 2,083,611 | 6/1937 | Marshall | 174—15 X |
| 2,611,586 | 9/1952 | Collins | 165—166 X |
| 3,024,298 | 3/1962 | Goltsos et al. | 174—15 |
| 3,361,868 | 1/1968 | Bachman | 174—15 X |

ROBERT A. O'LEARY, Primary Examiner

THEOPHIL W. STREULE, Assistant Examiner

U.S. Cl. X.R.

62—119, 333; 174—15